April 13, 1954     M. J. P. BOGART     2,675,095
PROCESS OF ABSORBING HYDROCARBONS FROM GASEOUS MIXTURE
Filed Nov. 28, 1951
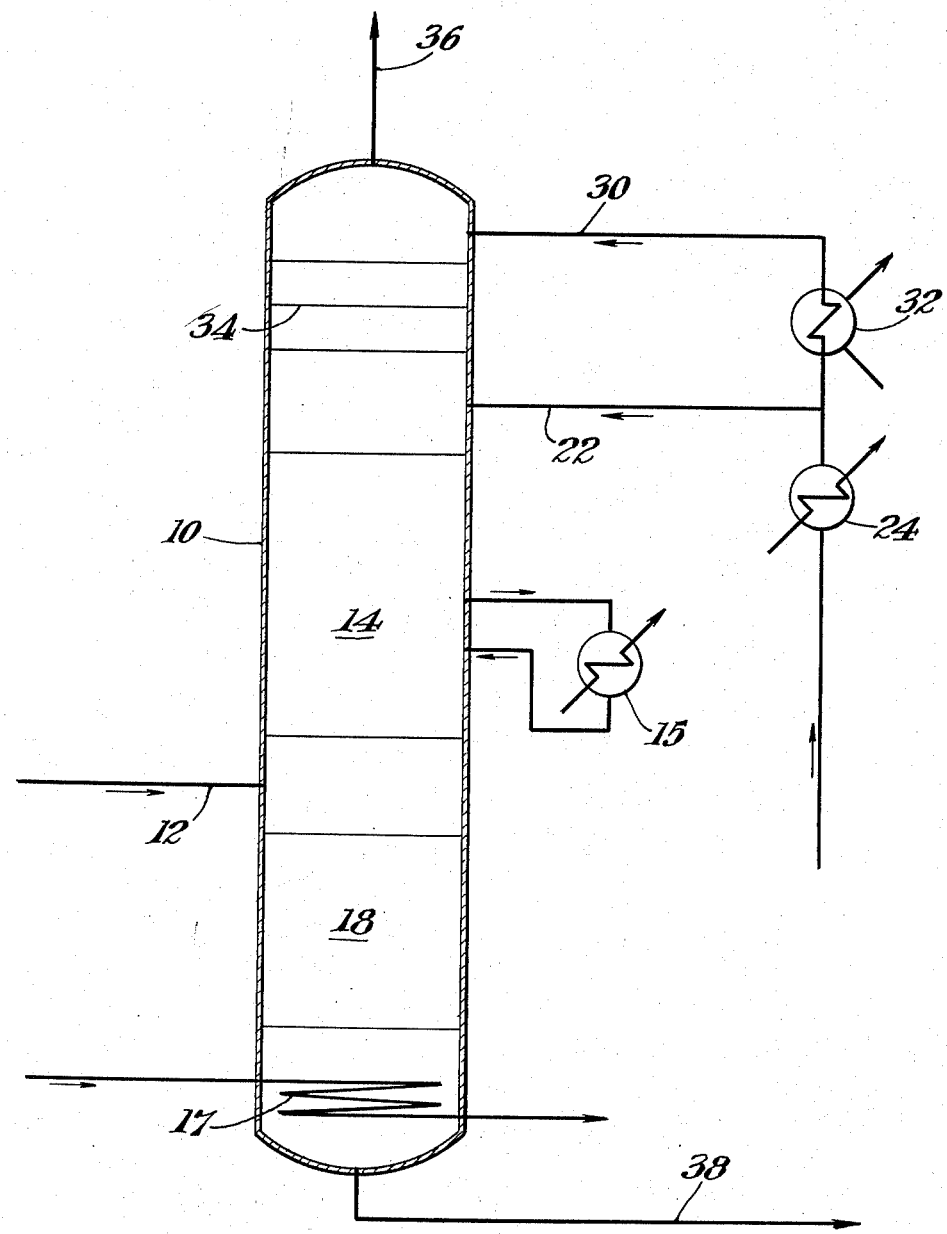
INVENTOR.
Marcel J. P. Bogart
BY
ATTORNEY Patented Apr. 13, 1954

2,675,095

UNITED STATES PATENT OFFICE 2,675,095

PROCESS OF ABSORBING HYDROCARBONS FROM GASEOUS MIXTURE

Marcel J. P. Bogart, Mamaroneck, N. Y., assignor to The Lummus Company, New York, N. Y., a corporation of Delaware Application November 28, 1951, Serial No. 258,606

2 Claims. (Cl. 183—115)

This invention relates generally to the absorption of volatile gases in liquid absorbents and is more specifically applicable to the controlled recovery of low boiling unsaturated hydrocarbons from gaseous mixtures thereof.

It is well known in the field of absorption that the volatile hydrocarbon fractions of mixed gases are absorbable in liquid hydrocarbon fractions which are somewhat less volatile than the components to be absorbed. The absorbed constituents in turn are usually the less volatile constitutents of the mixed gases fed so that it is possible to obtain a separation of refinery off-gases which were previously useful solely for fuel, by removing therefrom the very valuable low boiling point unsaturated hydrocarbons such as ethylene, propylene, butylenes, etc., as well as their saturated homologs (ethane, propane, etc.).

It is also known that the efficiency of absorption depends upon the temperature of the absorbing lean oil, the ratio of the rates of flow of the absorbent liquid to the mixed gas feed, and the pressure on the absorption zone. While some of these factors could be changed, it is generally found to involve considerable expense to obtain the ultimate and in such cases, more or less of the valuable products are lost rather than to attempt to recover them at the necessary increased expense.

The temperature of the lean oil introduced to the top of the absorber is also important in determining the loss of this material due to the stripping action of the residue gases exiting from the top of the absorber on this lean oil stream. A low lean oil inlet temperature is conducive to low losses of this material.

My invention relates particularly to the manner in which the lean oil or absorbent is introduced to the top of the absorption section whereby a controlled end point oil can be used with the most effective absorption and minimum loss of valuable end products.

Further objects and advantages of the invention will appear from the following description of a preferred form of embodiment thereof taken in connection with the attached drawing illustrative thereof, such drawing being a diagrammatic central section of an absorption column together with the principal feed and discharge lines.

As more particularly shown in the drawing, the absorber column 10 in accordance with my invention is adapted to receive a mixed feed gas from line 12 at a relatively low point in the column, such feed gas normally passing upward through an absorption section 14 which may be of bubble cap deck, screen deck, packed column or other well known type of contactor. It may be provided with one or more intercoolers 15 where heat of absorption is removed in the well known manner by cold water, refrigeration, etc. The lower part of the column includes a stripping section 18, provided with gas-liquid contacting devices as in 14, and means for introducing heat such as a reboiler coil, at 17. As is well known, the purpose of this stripping section and reboiler coil is to reduce the unavoidable absorption of the undesirable lowest boiling components in the mixed feed gas.

The main body of the absorption oil stream is introduced at an upper part of the absorption section of the column at 22, such lean oil being suitably cooled to the desired temperature by means of heat exchanger 24. As will hereinafter be described, the temperature of this heat exchange is such that cooling may be accomplished with water or other relatively inexpensive coolant.

As a departure from prior practice I prefer to feed a small portion of a further cooled lean oil to the top of the absorber as at 30, such lean oil preferably being passed through a refrigerated chiller 32. To establish the desired contact and heat transfer I find it desirable to use at least two or more bubble cap decks or other suitable gas-liquid contacting devices 34 in the upper part of the column between the two portions of lean oil feed. The residual or off-gas discharges at the top of the column through line 36 in the usual manner and the fat oil is drawn off the bottom of the column through line 38.

While the foregoing disclosure may not appear to depart materially from multiple feed lean oil systems of the past, it will be found that the difference in construction permits a difference in operation which is of fundamental importance. It is of course known that gas absorption differs from distillation in the supply of a foreign liquid rather than overhead condensate. The liquid which is usually chosen for economical reasons is seldom the ideal liquid from the view point of theoretical design. A major disadvantage to the usual absorption liquid is that it has an appreciable volatility or vapor pressure under the operating conditions in the absorber. This results in a simultaneous stripping action on the absorption liquid inasmuch as the unabsorbed components emanating from the mixed feed gas and leaving the top of the absorber in the off-gas stream are not saturated with respect to the absorption oil components. Near-saturation of this gas stream is accomplished in actual operation by undesirable vaporization, or stripping, of components in the lean oil fed to the column, some or all of which may not be present in the mixed gas feed. Depending upon the volatility of the absorbent liquid, this usually represents a considerable loss of this liquid since it is generally not recovered from the absorber off-gas.

This lean oil loss may be minimized by the use of an absorption liquid which is low in volatility and operating the absorption step at as low a temperature as possible. Although the use of an absorption liquid, low in volatility, will reduce its consequent make-up, there is a disadvantage in that the increased heat circulation requirements, the increased heat inputs and the higher temperature levels due to the low volatility are very great. It also will be appreciated that the disadvantages of low temperature operation lies in the fact that this usually requires the expensive installation and operation costs of refrigeration equipment.

A specific example of the advantages to be gained by the foregoing invention are based on the absorption of ethylene from a cracked gas having mainly hydrogen and methane as lower boiling impurities using a lean oil having approximately 4.8 mol. per cent pentane, 28.8 mol. per cent hexane, 62.2 mol. per cent heptane and 4.2 mol. per cent octane and higher.

In this case if the lean oil at 105° F. is all fed at one place to the absorber at 500 p. s. i. g. for example, the lean oil circulation rate for a given ethylene recovery is found to be approximately 70,000 barrels per stream day. The stripping loss of absorbent liquid to the off-gas then requires the excessive lean oil made-up quantity of 405 barrels per stream day. The intercooler duty (to cooling water) is estimated at nearly 8,000,000 B. t. u./hr. and the reboiler duty is approximately 56,000,000 B. t. u./hr.

In a preferred operation, approximately 5% of the lean oil was passed through the refrigerated heat exchanger 32 and chilled to 60° F. This was found to be sufficient to control the loss of absorbable gas constituents and reduced the recirculation of lean oil from 70,000 bbls. per stream day to about 44,000 bbls. per stream day for the same ethylene recovery as above. Furthermore, due to the fact that the top temperature is 60° F. instead of 105° F. the make-up was only 113 bbls. per stream day instead of 405 bbls. per stream day. This result could have been accomplished by putting in all of the lean oil at 60° F. If however, all of the lean oil is cooled to 60° F., the intercooler duty is approximately 13,000,000 B. t. u./hr. with a reboiler duty of 35,000,000 B. t. u./hr. About 27,000,000 B. t. u./hr. is then required for the refrigeration of the lean oil and the refrigeration unit is obviously very expensive.

By utilizing the water cooled exchanger 24 in the main stream of lean oil and only refrigerating the 5% portion passing to the absorber through line 30, the total refrigeration requirements are only 1,000,000 B. t. u./hr. instead of 27,000,000; the intercooler duty is only 6,700,000 B. t. u./hr. instead of 13,000,000 B. t. u./hr.

It is estimated that the saving in lean oil make-up in the plant under consideration amounted to more than $\frac{1}{10}$ of a cent per pound of finished product ethylene which is an appreciable percentage of the value of the product, and the saving in the cost of refrigeration is, of course, very substantial.

While I have shown and described a preferred form of embodiment of my invention, I am aware that modifications may be made thereto and I therefore desire a broad interpretation of my invention within the scope and spirit of the description herein and of the claims appended hereinafter.

I claim:

1. The process of absorbing desirable hydrocarbons from a mixture of gases containing such hydrocarbons in a single absorption column which comprises introducing the mixture of gases into the lower part of the absorption column, passing a stream of lean oil absorbent in heat exchange with cooling water, introducing a major portion of about 95% of the water cooled lean oil into an intermediate part of the column, passing the mixture of gases in the column in countercurrent contact with the major portion of water cooled lean oil, passing the minor portion of about 5% of said water cooled lean oil in heat exchange with a refrigerant and further cooling said minor portion to a temperature substantially lower than the temperature of the water cooled major portion of the lean oil, introducing the refrigerant cooled minor portion of lean oil into the upper part of the column, and passing the partially denuded gases from the intermediate part of the column in countercurrent contact with the refrigerant cooled minor portion of lean oil.

2. The process of absorbing desirable hydrocarbons from a mixture of gases including hydrogen, methane, ethane and the like in a single absorption column which comprises introducing the mixture of gases into the lower part of the absorption column, passing a stream of lean oil absorbent in heat exchange with cooling water, introducing a major portion of the water cooled lean oil into an intermediate part of the column at a temperature of about 100° F., passing the mixture of gases in the column in countercurrent contact with the major portion of water cooled lean oil, passing the minor portion of said water cooled lean oil in heat exchange with a refrigerant and further cooling said minor portion to a temperature of about 60° F., introducing the refrigerant cooled minor portion of lean oil into the upper part of the column and passing the partially denuded gases from the intermediate part of the column in countercurrent contact with the refrigerant cooled minor portion of lean oil.

References Cited in the file of this patent

UNITED STATES PATENTS

| Number | Name | Date |
|---|---|---|
| 1,987,267 | Ragatz | Jan. 8, 1935 |
| 2,026,265 | Bennett | Dec. 31, 1935 |
| 2,237,386 | Carney | Apr. 8, 1941 |
| 2,299,830 | Legatski et al. | Oct. 27, 1942 |
| 2,434,796 | Hachmuth | Jan. 20, 1948 |